(No Model.)
L. D. FEIN.
STEAM COOKER.
No. 466,904. Patented Jan. 12, 1892.
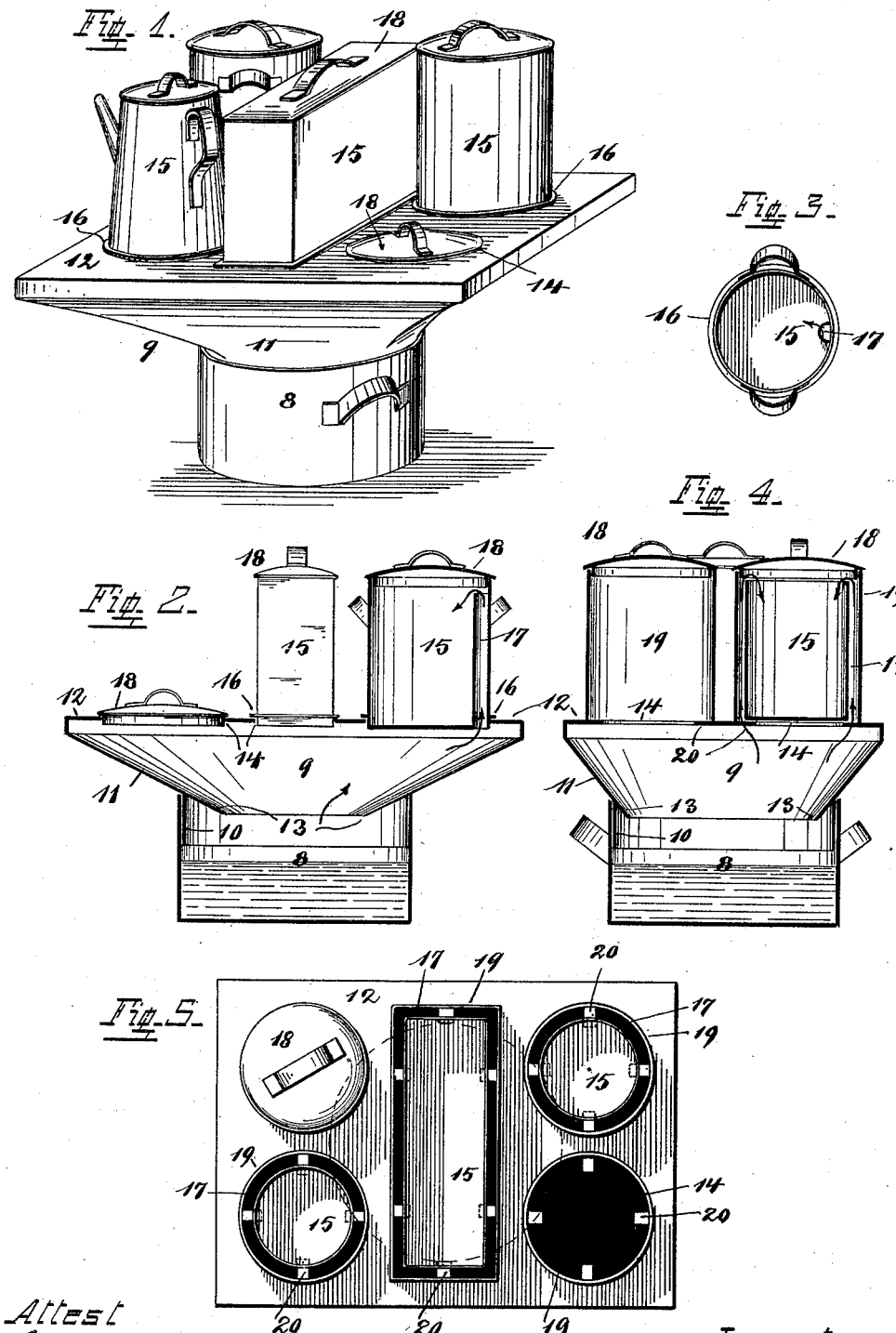

UNITED STATES PATENT OFFICE.

LOUISE D. FEIN, OF CINCINNATI, OHIO.

STEAM-COOKER.

SPECIFICATION forming part of Letters Patent No. 466,904, dated January 12, 1892.

Application filed May 9, 1891. Serial No. 392,225. (No model.)

*To all whom it may concern:*

Be it known that I, LOUISE D. FEIN, a citizen of the United States, residing at Cincinnati, in the county of Hamilton and State of Ohio, have invented certain new and useful Improvements in Steam-Cookers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention has relation to that class of steam-cookers which are provided with a number of openings at their top, adapted to receive and through which communication is had with the interior of a corresponding number of cooking-vessels; and its object is to provide a cooker of the class described in which, first, the food being cooked will be subjected to both the direct and indirect action of steam; second, provision is made for the cooking of a number of different foods in disconnected and separate vessels without necessitating any increase in the size of the steam-generator, so that a small fire, such as is received from a single stove-hole, or from the burner of a vapor or oil stove, may be used for the simultaneous heating of a number of vessels, thereby gaining the advantage, and at the same time overcoming the disadvantages, both of the separate disconnected cooking-vessels and those in which the vessels are located one above the other; third, the water of the condensing steam will be conveyed back into the generator; fourth, all or but a part of the vessels may be utilized at a time, and a vessel in which the contents are cooked readily removed without necessitating rearrangement of the other vessels or retarding the cooking and without necessitating any increase in the parts or cost of the cooker, and, fifth, to otherwise improve upon steam-cookers heretofore constructed.

To these ends the invention consists in certain novel features in the construction of the cooker, substantially as hereinafter described, and particularly pointed out in the subjoined claims.

Figure 1 is a perspective view of the cooker complete. Fig. 2 is a longitudinal section of the same. Fig. 3 is a top view of one of the vessels removed. Fig. 4 is a cross-section of the device, showing a modified construction for admitting the steam to the interior of the vessels. Fig. 5 is a top view of this modified form.

8 is the steam-generator, which is partly filled with water when in use and subjected to the heat of a suitable fire. It consists of a circular vessel of a size to fit a stove-hole of ordinary dimension or the burner of a vapor or oil stove.

9 is a hollow base through which the generated steam rises, having a vertical flange 10, fitting tightly inside of the steam-generator and connecting to an up and outwardly flaring body 11, which supports a top 12. This body 11 is continued on inwardly from its junction with flange 10, and forms a projecting lip 13, which conveys the water of the condensing steam back to the generator, preventing it from oozing out at the sides. The top is provided with a suitable number of openings 14, into which a corresponding number of vessels 15 fit. These vessels may be round or square, as shown, or exclusively of either the one or the other shape. Importance is attached to this form of steam-generator in connection with that of the base, for a cooker so constructed combines the advantages of economy of fuel and small heating-surface of those in which the cooking-vessels are located one above another with the advantages of accessibility and freedom from transmittal of odors from one vessel to another of those in which the cooking-vessels are independent and disconnected, and at the same time avoids the objections heretofore found with all of such cookers in the liability of the water of condensation oozing out of the spaces between the parts of the cooker in which the connection is not absolutely perfect.

The vessels have supports 16, whereby they rest on the top, and which prevent them from dropping down into the interior of the base. They are also provided with one or more vertical conduits 17, reaching through their bottom and stopping somewhere below their top, thereby admitting steam from the generator and base to the interior of the vessel, and subjecting its contents to the direct action of the steam. The lids 18 of the vessels fit also the corresponding holes for the latter in the top, so that in cases when not all of the vessels are engaged their lids may be used for the purpose of closing these holes in the top, preventing thereby the escape and loss of steam and heat. (See Fig. 1.)

The modified form illustrated in Figs. 4 and 5 differs, principally, as to the mode for admitting steam to the interior of the vessels. In this form stationary shells 19 are connected to the top and surround the holes therein. The vessels 15 are somewhat smaller and lower, and rest inside of shells 19, being sustained on supports 20, formed by a portion of the top, which projects inwardly, the remaining parts of the top between said supports being cut out, so as to permit the steam from the generator to enter between vessel and shells and rising in said space enable it to enter the vessel, for the same purpose as previously described. In this case the lids are placed on shells 19, instead of on the vessels themselves.

As will be seen, the food to be prepared is subjected to the direct and indirect action of the steam, which latter rises from the generator and enters and surrounds the vessels, and, as will be further perceived, a number of the latter may be used at the same time and over a comparatively small fire-space.

Having described my invention, I claim as new—

1. The herein-described steam-cooker, comprising a steam-generator, a base having interior communication therewith and consisting of a flat top having openings and flaring sides which project upward and outward and downward and inward from the top of said generator, whereby the upper end of said base will be located above and project laterally and longitudinally beyond the generator, and the lower end thereof be located within and away from the wall of the same, and vessels fitting said openings in the top of the generator and having interior communication therewith, all substantially as described, and for the purposes specified.

2. The herein-described steam-cooker, comprising a steam-generator, a base having interior communication therewith and consisting of a flat top having openings, depending flanges projecting into said generator and substantially parallel with the wall thereof, and flaring sides which project upward and outward and downward and inward from the top of said generator, whereby the upper end of said base will be located above and project laterally and longitudinally beyond the generator and the lower ends of said flaring sides be located within and away from the wall of the same, vessels fitting said openings in the top of the base and having interior communication at or near their upper ends with the interior of the base, and lids for said cooking-vessels of a size or sizes to close both the latter and the openings in the top of the base, all substantially as described, and for the purposes specified.

In testimony whereof I affix my signature in presence of two witnesses.

LOUISE D. FEIN.

Witnesses:
SAMUEL M. QUINN,
CARL SPENGEL.